United States Patent [19]

Fort et al.

[11] Patent Number: 4,786,134
[45] Date of Patent: Nov. 22, 1988

[54] QUICK FIT CONNECTOR FOR OPTICAL FIBERS

[75] Inventors: Francois Fort, Paris; Michel Maindron, St. Martin de Brethencourt, both of France

[73] Assignee: Fort, Fibres Optiques Recherche et Technologie, Paris, France

[21] Appl. No.: 840,869

[22] Filed: Mar. 18, 1986

[30] Foreign Application Priority Data

Mar. 18, 1985 [FR] France ................................ 8503928

[51] Int. Cl.⁴ ............................................. G02B 6/40
[52] U.S. Cl. ............................ 350/96.20; 83/909; 225/96
[58] Field of Search ............... 350/96.20, 96.21, 96.1, 350/96.34; 83/909; 30/94, 91.2; 225/96, 96.5

[56] References Cited

U.S. PATENT DOCUMENTS

| | | | |
|---|---|---|---|
| 3,734,594 | 5/1973 | Trambarulo | 350/96.21 |
| 4,133,061 | 1/1979 | Guen et al. | 350/96.21 |
| 4,178,067 | 12/1979 | Johnson et al. | 350/96.21 |
| 4,182,017 | 1/1980 | Ford et al. | 350/96.21 |
| 4,315,368 | 2/1982 | Basile | 30/91.2 |
| 4,447,121 | 5/1984 | Cooper et al. | 350/96.21 |
| 4,458,983 | 7/1984 | Roberts | 350/96.21 |
| 4,459,746 | 7/1984 | Goodman | 225/96 |
| 4,519,672 | 5/1985 | Rogstadius | 350/96.21 |
| 4,607,911 | 8/1986 | Rhodes | 350/96.2 |
| 4,648,688 | 3/1987 | Ashman et al. | 350/96.21 |
| 4,679,895 | 7/1987 | Huber | 350/96.2 |

FOREIGN PATENT DOCUMENTS

| | | | |
|---|---|---|---|
| 0048561 | 3/1982 | European Pat. Off. | 350/96.2 |
| 2413674 | 7/1979 | France | 350/96.2 |
| 0011561 | 5/1980 | France | 350/96.2 |
| 2445302 | 7/1980 | France | 350/96.2 |
| 0050308 | 5/1981 | Japan | 350/96.2 |
| 0188005 | 11/1982 | Japan | 350/96.2 |

*Primary Examiner*—Charles T. Jordan
*Assistant Examiner*—Michael J. Carone
*Attorney, Agent, or Firm*—Browdy and Neimark

[57] ABSTRACT

A quick connector for optical fibers of the type comprising a first and second tubular bodies through which passes an optical fiber, which are aligned axially and joined together by means of a nut which partially envelops the second body and is screwed about the first body. The connector further comprises means for fixing and centering the fiber by clamping, this means being formed more particularly by a rigid sleeve and a deformable sleeve intended to be fitted on the optical fiber and to be housed end to end inside said second body.

Furthermore, the connector cooperates with a tool intended to carry out the circular cutting or cleavage of the proximal end of the optical fiber.

12 Claims, 1 Drawing Sheet

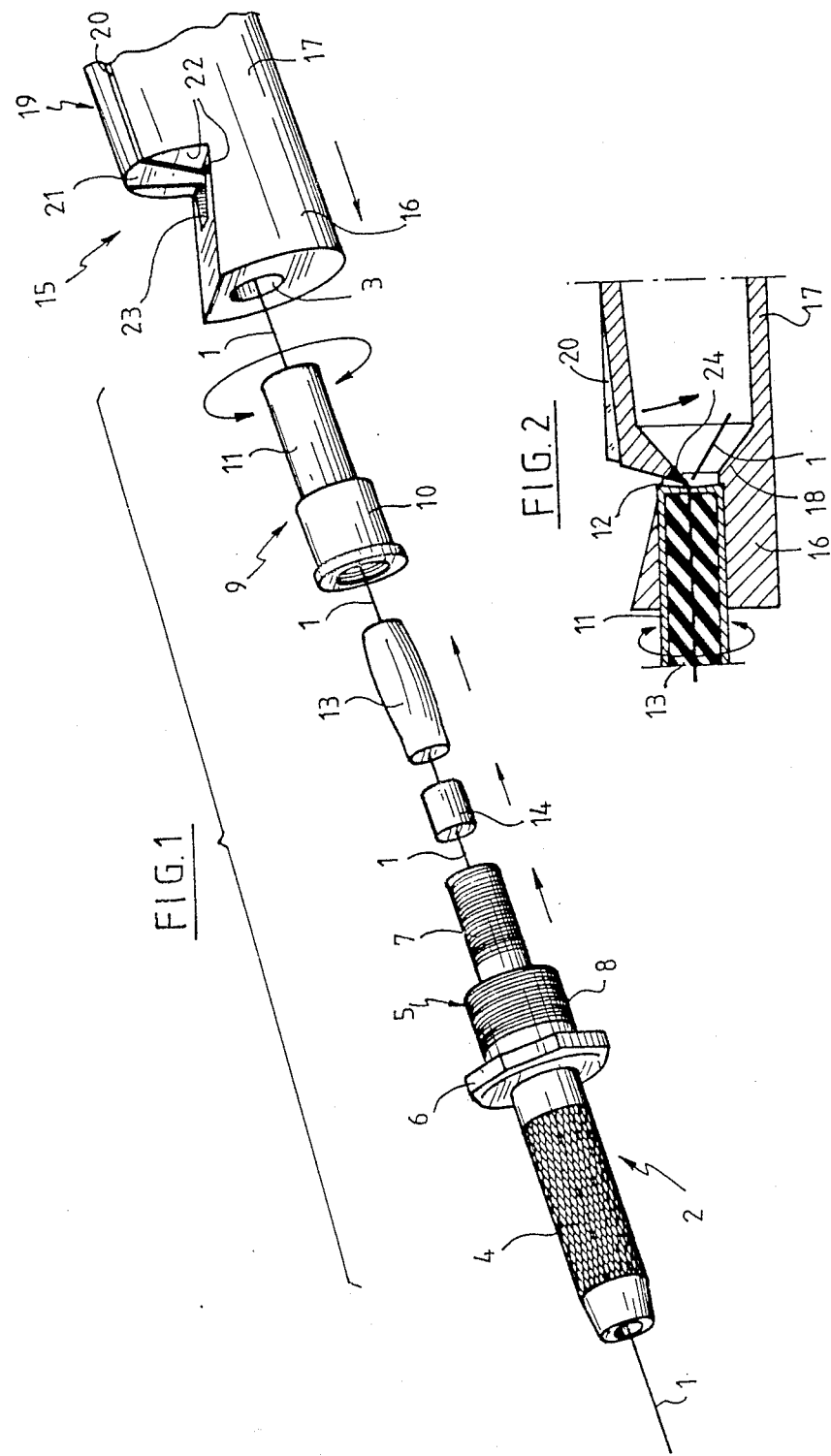

QUICK FIT CONNECTOR FOR OPTICAL FIBERS

BACKGROUND OF THE INVENTION

The present invention relates to a connector for optical fibers.

Among the different techniques of producing an industrial connector for optical fibers, the technique is known which consists in fitting an optical fiber inside a calibrated metal end piece and holding it in position by bonding. This type of connector also requires, besides the bonding agent for fixing, final polishing of the end of the optical fiber, which is tedious, inconvenient in certain situations (for example when an operator is on a ladder) and very time consuming.

SUMMARY OF THE INVENTION

The purpose of the present invention is to provide a connector for optical fibers which responds better to the requirements of practice than prior known connectors with the same aim in view, more particularly in that:

for fixing the fiber in the metal end piece there is no longer need to use a bonding agent, there is no longer need to subject the end of the fiber to a polishing operation, and connection of an optical fiber to end optoelectronic equipment and—if need be (passing through dividing walls, repair, etc. . .)—the connection of the sections of an optical fiber together are performed much more quickly.

The present invention provides a connector for the quick connection of optical fibers, of the type comprising a first and a second tubular body through which an optical fiber passes, which are aligned axially and joined together by means of a nut which partially envelops the second body and is screwed about the first body, which connector is characterized in that it comprises means for fixing and centering the fiber by clamping.

In an advantageous embodiment of the quick connector of the invention, said fixing and centering means are formed by a rigid sleeve and a deformable sleeve, both being fitted onto the optical fiber and being intended to be housed end to end inside said second body.

In a preferred arrangement of this embodiment, said second body comprises a rear portion of small diameter, which is closed at its proximal end by a bottom pierced centrally for passing the fiber therethrough and in which the two sleeves are housed end to end, the sum of the lengths of which is greater than the length of said rear portion, and a front portion of large diameter which is tapped and intended to be screwed about the proximal zone of said first body, so that the rigid sleeve compresses the deformable sleeve against the bottom which thus clamps the optical fiber, while fixing and centering the same.

In another preferred embodiment of the quick connector of the invention, the outer face of the bottom of the rear portion of the second body is slightly recessed (concave) with respect to the base of said rear portion, so as to protect the proximal end of the fiber and to cooperate with the cutting element of a tool for cutting said proximal end of the optical fiber, associated with the connector.

In a further preferred embodiment of the quick connector of the invention, said tool for cutting the proximal end of the optical fiber comprises a cutting tongue, which is provided with a free cutting end and with a fixed end and which is disposed axially and pivotally about said fixed end, in the wall of a tubular piece, so as to allow the fiber to be cut by circular cutting or cleavage, namely by compression of the free end of the tongue and complete rotation through 360° of the piece which it carries, when the rear portion of said second body is introduced through the opening situated in the front part of the tubular piece.

In a further preferred embodiment of the quick connector of the invention, said tubular piece is formed of the three following axial portions:

a front thick wall portion, whose length is substantially equal to the length of the rear portion of said second body and which is intended to receive, with the necessary functional clearance, said rear portion from which the fiber to be cut projects slightly, a rear thin wall portion, whose length is greater than that of the front portion of said tubular piece, and an intermediate portion between the rear and front portions of this piece, whose thickness decreases linearly at the internal part of the tool, said cutting tongue being defined:

laterally, by two longitudinal slits which are formed:

over almost the whole of the length of the rear portion of the tubular tool, except for a small zone for connecting or fixing the tongue to the wall of said rear portion;

over the whole of the intermediate portion, and very slightly over the front portion of the tubular tool, and at the level of its free end, by a substantially L shaped notch corresponding to the suppression of the upper zone of the front portion of said tubular piece, the face of this notch disposed along the large side of the L being contained in a substantially horizontal plane and comprising a window allowing the downward movement of the free end of the cutting tongue, this free end being situated substantially at the level of the intermediate portion and having a thickness decreasing from the rear to the front of this tubular piece, which gives to this free end a substantially triangular profile.

In a preferred arrangement of this embodiment, said longitudinal slits are contained in two planes slanted with respect to the vertical and converging substantially towards the axis of the tubular piece, so that the free end of the tongue has a substantially triangular shape not only in profile but also frontally, and the notch has the face which is disposed along the small side of the L contained in a transverse plane slanting forwardly through an appropriate angle, so that the free end of the tongue is slanted by this same angle for mating with the concavity formed in the bottom of the rear portion of said second body.

In another advantageous embodiment of the quick connector of the invention, the free end of said tongue is made cutting by means of an appropriate tip, more particularly a diamond or fine carbide tip, which is applied to the lower part of this free end.

Besides the preceding arrangements, the invention further comprises other arrangements which will be clear from the following description.

BRIEF DESCRIPTION OF THE DRAWINGS

The invention will be better understood from the complement of description which follows which refers to the accompanying drawings in which:

FIG. 1 is an exploded perspective view of the connector of the invention, and

FIG. 2 is a sectional view showing the cooperation between the proximal end of the connector, in which the fiber has been previously fixed in accordance with the invention, and a tool for cutting the proximal end of this fiber, it being also in accordance with the invention.

It should however be understood that these drawings and the corresponding descriptive parts are given solely by way of illustration of the subject of the invention, of which they form in no way a limitation.

DESCRIPTION OF THE PREFERRED EMBODIMENTS

Reference 1 denotes an optical fiber which passes axially through a tubular body 2 of a connector.

Body 2 has a front portion 4 and a rear portion 5 separated by a transverse collar 6.

On the front portion 4 is applied an external insulating sheath (not shown) of the optical cable carrying the fiber 1, whereas an inner insulating sheath (not shown) accompanies this fiber inside the front portion 4 substantially as far as the level of said collar 6.

The rear portion 5 of the tubular body 2 comprises two zones of different diameters:

- a first zone 7 of small diameter, which is disposed at the level of the proximal end of body 2 and which is threaded, and
- a second zone 8 of large diameter which follows immediately on the collar 6 and which is also threaded for receiving a clamping nut (known per se and not shown for the sake of simplifying the drawings), after said first zone 7 has received the distal end of a second tubular body 9.

The second tubular body 9 also comprises two portions:

- a front portion 10 of large diameter, which is tapped and intended to be screwed on said first zone 7 of small diameter of the rear portion 5 of body 2 and which has substantially the same length as this first zone 7,
- and a rear portion 11 of smaller diameter intended to house the means for fixing and centering fiber 1 in accordance with the invention which will be described further on.

The hollow tubular body 9 is closed at its proximal end by a bottom 12 (see FIG. 2) pierced centrally for passing the optical fiber 1 therethrough.

Said means for fixing and centering the fiber inside the connector are formed by a first deformable sleeve 13 and by a second rigid sleeve 14 fitted, like the first sleeve, about the optical fiber 1 and intended for cooperation with sleeve 13 as will be described hereafter.

The length of these two sleeves 13 and 14 is such that (sleeve 13 being preferably longer than sleeve 14) the sum of their lengths is greater, for example by 25%, than the length of the rear portion 11 of the second tubular body 9: thus, when this body 9 is pushed axially towards a proximal end of body 2, and is screwed about its proximal end in the direction of the arrow, the rigid sleeve 14 compresses sleeve 13 against the bottom 12 of the housing common to both said sleeves and formed by the cavity of the rear portion 11 of body 9 (sleeves 13 and 14 have a diameter which is slightly less than the internal diameter of said portion 11): thus, sleeve 13 clamps the optical fiber 1 by deformation thus securing same without having recourse to a bonding agent, as was the case in the prior art.

The use of a deformable sleeve 13 makes clamping of the fiber non destructive of the integrity thereof.

In so far as the materials in particular are concerned from which said deformable sleeve 13 may be formed, not only elastomers and plastic materials, but also deformable metals such as lead and even copper may be mentioned.

The use of an original tool cooperating closely with the bottom of the rear portion of the second body 9 of the connector constructed in accordance with the present invention also does away with the need of the operation for polishing the proximal end of the optical fiber 1.

It is a tool which is also formed by a substantially tubular body 15 in which three portions may be distinguished:

- a front thick wall portion 16, in which the diameter of the central opening 3 is such that it may receive, with the necessary functional clearance, the rear portion 11 of the second body 9 and which has a length substantially equal to that of this portion 11,
- a rear thin wall portion 17, whose length is at least about three times that of portion 16, for reasons of handiness of the tool, and
- an intermediate portion 18 for connection between the front and rear portions 16 and 17, whose thickness decreases linearly, at the internal part of body 15, from the thick wall to the thin wall.

In the upper part of body 15 there is axially formed a tongue 19 which is defined:

- laterally, by two longitudinal slits 20 which are formed over almost the whole of the length of the rear portion 17 (except necessarily for a small zone, not shown, connecting tongue 19 to the wall of said portion 17), over the whole of the intermediate portion 18 and, very slightly, in the front portion 16, and
- at the level of its free end 21, by a substantially L shaped notch 22 formed by removing the upper zone of the front portion 16.

Preferably, said slits 20 are contained in two planes slanting with respect to the vertical and converging substantially towards the axis of the body 15 of the tool, so that the free end 21 of tongue 19 has substantially triangular shape not only in profile, but also frontally.

Furthermore, notch 22 (whose face disposed along the large side of the L is contained in a substantially horizontal plane), has its face disposed along the other (small) side of the L contained in a transverse plane slanted forwardly by an appropriate angle, so that the free end 21 of the tongue 19 is slanted forwardly by this same angle for allowing this end 21 to mate with the concavity formed in the bottom 12 of said rear portion 11 of the second body 9.

In the substantially horizontal face of notch 22 a small window 23 is formed allowing downward movement of end 21.

The free end 21 of tongue 19 is made cutting by means of a diamond or fine carbide tip 24 applied to its lower part. It is then sufficient for an operator to exert a pressure on this end 21, for example a finger pressure, so as to cause the cutting (or slicing) tip to come into contact with the fiber 1 which projects from the connector, while rotating the tool through 360°, which allows fiber 1 to be cut, without splinters, by circular cutting or cleavage, namely by pressing tongue 19 and rotating the piece 15 which carries it through a complete revolution (360°).

It goes without saying that, instead of exerting a finger pressure on the tongue 19, the necessary cutting or cleavage pressure on this tongue 19 may be exerted by a mechanical means, for example by a means using a return spring linked to said tongue.

The cooperation between the bottom 12 of the rear portion of the second body 9 and the tool according to the invention is made easier by making the outer face of said bottom 12 slightly recessed, namely defined by a segment of a sphere having an appropriate radius.

Furthermore, it is preferable to form in the internal wall of the front portion 16 of the cutting tool a shoulder 25, more particularly an annular shoulder which extends towards the axis of piece 15 and which forms a stop for the proximal end of the connector when this latter is introduced into the central opening 3 of the tool.

(In the foregoing, the "front" and "rear" positions are defined with respect to an operator who handles the cutting tool in the direction shown in FIG. 1).

As is clear from the foregoing, the invention is in no way limited to those of its embodiments and modes of application which have been described more explicitly; it embraces, on the contrary, all variants thereof which may occur to a technician skilled in the matter, without departing from the scope or spirit of the present invention.

What is claimed is:

1. A combination of a connector for quick connection of an optical fiber and of a tool for cutting said optical fiber, wherein said connector comprises:
    a first and a second tubular body through which an optical fiber passes and which are axially aligned and joined together by means of a nut partially enveloping said second tubular body and screwed about said first tubular body,
    means for fixing and centering said optical fiber, said second tubular body comprising:
    a rear portion closed at a proximal end thereof by a bottom pierced centrally for passing said optical fiber and having an outer face, which is slightly recessed with respect to said proximal end of said rear portion, so as to protect a proximal end of said optical fiber, and
    a front portion intended to be screwed about said proximal end of said first tubular body, and wherein said tool for cutting said proximal end of said optical fiber comprises a cutting element cooperating with said outer recessed face of said rear portion, so as to cut by cleavage said optical fiber.

2. The combination as claimed in claim 1, wherein said cutting tool comprises a tubular piece having an opening in a front part thereof which is intended to receive said rear portion of said second tubular body and wherein said cutting element comprises an axial cutting tongue provided with a free cutting end and a fixed end for pivotal movement thereof, said tongue being disposed in a wall of said tubular piece so as to allow the fiber to be cut by cleavage by circular cutting obtained by pressing said free end of said cutting tongue on said proximal end of the optical fiber jutting up from said rear portion of said second tubular body introduced in said opening of said tubular piece and by rotating said tubular pieces through a complete revolution of at least 360°.

3. The connector as claimed in claim 2, wherein said tubular piece is formed of the three folloiwng axial portions:
    a front thick wall portion whose length is substantially equal to the length of the rear portion of said second body and which is intended to receive, with the necessary functional clearance, said rear portion from which the fiber to be cut projects slightly,
    a rear thin wall portion, whose length is greater than that of the front portion of said tubular piece, and
    an intermediate portion between the rear and front portions of said piece, whose thickness decreases linearly in the internal part of the tool, said cutting tongue being defined:
    laterally, by two longitudinal slits which are formed:
        over almost the whole of the length of the rear portion of the tubular tool, except for a small zone for connecting or fixing said tongue to the wall of said rear portion,
        over the whole of the intermediate portion, and
        very slightly, over the front portion of the tubular tool, and
    at its free end, by a substantially L shaped notch corresponding to the removal of the upper zone of the front portion of said tubular piece, the face of said notch disposed along the large side of the L being contained in a substantially horizontal plane comprising a window allowing the downward movement of the free end of the cutting tongue, said free end being situated substantially at the level of the intermediate portion and having a thickness decreasing from the rear to the front of said tubular piece, which gives to this free end a substantially triangular profile.

4. The connector as claimed in claim 3, wherein said longitudinal slits are contained in two planes slanting with respect to the vertical and converging substantially towards the axis of the tubular piece, so that the free end of the tongue has a substantially triangular shape not only in profile but also frontally, and said notch has its face which is disposed along the small side of the L contained in a transverse plane slanting forwardly by an appropriate angle, so that the free end of the tongue is slanted by the same angle for mating with the concavity formed in the bottom of the rear portion of said second body.

5. The connector as claimed in claim 3, wherein the free end of said tongue is made cutting by means of an appropriate tip, more particularly a diamond or fine carbide tip, which is applied to the lower part of said free end.

6. The connector as claimed in claim 3, wherein a shoulder, more particularly an annular shoulder, is formed in the internal wall of the front portion of said tubular piece and projects towards the axis of said tubular piece so as to form a stop for the proximal end of the connector when this latter is introduced into the central opening of the tubular piece.

7. A combination of a connector for quick connection of an optical fiber and of a tool for cutting said optical fiber, wherein said connector comprises:
    a first and a second tubular body through which an optical fiber passes and which are axially aligned and joined together by means of a nut partially enveloping said second tubular body and screwed about said first tubular body, means for fixing and centering said optical fiber by clamping, comprising a rigid sleeve and a deformable sleeve, both fitted onto said optical fiber and intended to be housed end to end inside said second tubular body, said second tubular body comprising:

a rear portion of small diameter closed at a proximal end thereof by a bottom pierced centrally for passing said optical fiber therethrough and having end to end said rigid and deformable sleeves, said sleeves having each a length such that the sum of the lengths thereof is greater than a length of said rear portion, and said bottom having an outer face which is slightly recessed with respect to said proximal end of said rear portion, so as to protect a proximal end of said optical fiber, and a front portion of larger diameter intended to be screwed about said proximal end of said first tubular body, so that said rigid sleeve compresses said deformable sleeve against said bottom of said rear portion, thus clamping said optical fiber while fixing and centering the same, and wherein said tool for cutting said proximal end of said optical fiber comprises a cutting element cooperating with said outer recessed face of said rear portion, so as to cut by cleavage said optical fiber.

8. The combination as claimed in claim 7, wherein said cutting tool comprises a tubular piece having an opening in a front part thereof which is intended to receive said rear portion of said second tubular body and wherein said cutting element comprises an axial cutting tongue provided with a free cutting end and a fixed end for pivotal movement thereof, said tongue being disposed in a wall of said tublar piece so as to allow the fiber to be cut by cleavage by circular cutting obtained by pressing said free end of said cutting tongue on said proximal end of the optical fiber jutting up from said rear portion of said second tubular body introduced in said opening of said tubular piece and by rotating said tubular pieces through a complete revolution of at least 360.

9. The connector as claimed in claim 8, wherein said tubular piece is formed of the three following axial portions:

a front thick wall portion whose length is substantially equal to the length of the rear portion of said second body and which is intended to receive, with the necessary functional clearance, said rear portion from which the fiber to be cut projects slightly, a rear thin wall portion, whose length is greater than that of the front portion of said tubular piece, and an intermediate portion between the rear and front portions of said piece, whose thickness decreases linearly in the internal part of the tool, said cutting tongue being defined:

laterally, by two longitudinal slits which are formed:

over almost the whole of the length of the rear portion of the tubular tool, ecept for a small zone for connecting or fixing said tongue to the wall of said rear portion, over the whole of the intermediate portion, and very slightly, over the front portion of the tubular tool, and at its free end, by a substantially L shaped notch corresponding to the removal of the upper zone of the front portion of said tubular piece, the face of said notch disposed along the large side of the L being contained in a substantially horizontal plane comprising a window allowing the downward movement of the free end of the cutting tongue, said free end being situated substantially the level of the intermediate portion and having a thickness decreasing from the rear to the front of said tubular piece, which gives to this free end a substantially triangular profile.

10. The connector as claimed in claim 9, wherein said longitudinal slits are contained in two planes slanting with respect to the vertical and converging substantially towards the axis of the tubular piece, so that the free end of the tongue has a substantially triangular shape not only in profile but also frontally, and said notch has its face which is disposed along the small side of the L contained in a transverse plane slanting forwardly by an appropriate angle, so that the free end of the tongue is slanted by the same angle for mating with the concavity formed inthe bottom of the rear portion of said second body.

11. The connector as claimed in claim 9, wherein the free end of said tongue is made cutting by means of an appropriate tip, more particularly a diamond or fine carbide tip, which is applied to the lower part of said free end.

12. The connector as claimed in claim 9, wherein a shoulder, more particularly an annular shoulder, is formed in the internal wall of the front portion of said tubular piece and projects towards the axis of said tubular piece so as to form a stop for the proximal end of the connector when this latter is introduced into the central opening of the tubular piece.

* * * * *